United States Patent
Rastogi et al.

(10) Patent No.: US 12,197,872 B2
(45) Date of Patent: *Jan. 14, 2025

(54) GUIDED TEXT GENERATION FOR TASK-ORIENTED DIALOGUE

(71) Applicant: Google LLC, Mountain View, CA (US)

(72) Inventors: Abhinav Rastogi, Sunnyvale, CA (US); Mihir Sanjay Kale, Mountain View, CA (US)

(73) Assignee: Google LLC, Mountain View, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/167,946

(22) Filed: Feb. 13, 2023

(65) Prior Publication Data

US 2023/0186033 A1    Jun. 15, 2023

Related U.S. Application Data

(63) Continuation of application No. 17/007,270, filed on Aug. 31, 2020, now Pat. No. 11,604,929.

(51) Int. Cl.
*G06F 17/00* (2019.01)
*G06F 3/16* (2006.01)
*G06F 40/30* (2020.01)

(52) U.S. Cl.
CPC .............. *G06F 40/30* (2020.01); *G06F 3/167* (2013.01)

(58) Field of Classification Search
None
See application file for complete search history.

(56) References Cited

U.S. PATENT DOCUMENTS

| | | | |
|---|---|---|---|
| 10,558,426 B2 * | 2/2020 | Kothari | G06F 3/167 |
| 11,200,282 B1 | 12/2021 | Devenny et al. | |
| 11,604,929 B2 * | 3/2023 | Rastogi | G06F 40/30 |
| 2019/0286480 A1 * | 9/2019 | Park | G06F 9/451 |
| 2020/0152181 A1 | 5/2020 | Woo et al. | |
| 2021/0067460 A1 | 3/2021 | Lillie et al. | |
| 2022/0147702 A1 * | 5/2022 | Li | G06N 3/088 |

OTHER PUBLICATIONS

Bapna, Ankur, et al., Towards Zero-Shot Frame Semantic Parsing for Domain Scaling, arXiv:1707.02363v1 [cs.AI] Jul. 7, 2017, pp. 1-5.

(Continued)

*Primary Examiner* — Satwant K Singh
(74) *Attorney, Agent, or Firm* — Botos Churchill IP Law (57) ABSTRACT

Systems and methods for guided text generation in task-based dialogue. In some aspects of the technology, an automated assistant system is configured to receive a user request, call multiple APIs, generate dialogue acts based on data received from each API, replace any slot names in the dialogue acts with natural language descriptions of the slots, concatenate the modified dialogue acts, and pass the concatenated result to an NLG model for generation of a natural language response. In some aspects of the technology, the automated assistant may be configured to generate simple templated responses based on the data received from each API, concatenate the simple templated responses, and pass the concatenated sequence to an NLG model trained as a sequence-to-sequence transformer for generation of a final natural language response.

20 Claims, 3 Drawing Sheets

(56) References Cited

OTHER PUBLICATIONS

Barzilay, Regina , et al., Sentence Fusion for Multidocument News Summarization, © 2005 Association for Computational Linguistics, vol. 31, No. 3.
Budzianowski, Pawel , et al., Hello, It's GPT-2—How Can I Help You? Towards the Use of Pretrained Language Models for Task-Oriented Dialogue Systems, Proceedings of the 3rd Workshop on Neural Generation and Translation (WNGT 2019), pp. 15-22, 2019.
Budzianowski, Pawel , et al., MultiWOZ—A Large-Scale Multi-Domain Wizard-of-Oz Dataset for Task-Oriented Dialogue Modelling, Proceedings of the 2018 Conference on Empirical Methods in Natural Language Processing, pp. 5016-5026, Brussels, Belgium, Oct. 31-Nov. 4, 2018.
Chen, Zhlyu , Few-shot NLG with Pre-trained Language Model, Few-shot NLG with Pre-trained Language Model, arXiv:1904.09521v1 [cs.CL] Apr. 21, 2019, pp. 1-10.
Chen, Zhiyu , et al., Few-Shot NLG with Pre-Trained Language Model, arXiv:1904.09521v2 [cs.CL] Sep. 6, 2019, pp. 1-8.
Chen, Zhiyu , et al., Few-Shot NLG with Pre-Trained Language Model, arXiv:1904.09521v3 [cs.CL] Apr. 19, 2020, pp. 1-8.
Chen, Wenhu , et al., Semantically Conditioned Dialog Response Generation via Hierarchical Disentangled Self-Attention, Proceedings of the 57th Annual Meeting of the Association for Computational Linguistics, pp. 3696-3709, 2019.
Devlin, Jacob , et al., BERT: Pre-training of Deep Bidirectional Transformers for Language Understanding, Proceedings of NAACL-HLT 2019, pp. 4171-4186.
Doddington, George , Automatic Evaluation of Machine Translation Quality Using N-gram Co-Occurrence Statistics, pp. 138-145, 2002.
Du, Yuheng , et al., Schema-Guided Natural Language Generation, arXiv:2005.05480v1 [cs.CL] May 11, 2020, pp. 1-13.
Dusek, Ondrej , Neural Generation for Czech: Data and Baselines, arXiv:1910.05298v1 [cs.CL] Oct. 11, 2019, pp. 1-12.
Dusek, Ondrej , et al., A Context-aware Natural Language Generator for Dialogue Systems, Proceedings of the SIGDIAL 2016 Conference, pp. 185-190.
Dusek, Ondrej , et al., Semantic Noise Matters for Neural Natural Language Generation, arXiv:1911.03905v1 [cs. CL] Nov. 10, 2019, pp. 1-8.
Dusek, Ondrej , et al., Sequence-to-Sequence Generation for Spoken Dialogue via Deep Syntax Trees and Strings, Proceedings of the 54th Annual Meeting of the Association for Computational Linguistics, pp. 45-51, 2016.
Gardent, Claire , et al., The WebNLG Challenge: Generating Text from RDF Data, Proceedings of The 10th International Natural Language Generation conference, pp. 124-133, 2017.
Gatt, Albert , et al., Survey of the State of the Art in Natural Language Generation: Core Tasks, applications and evaluation, arXiv:1703.09902v4 [cs.CL] Jan. 29, 2018, pp. 1-118.
Kale, Mihir , Text-to-Text Pre-Training for Data-to-Text Tasks, arXiv:2005.10433v2 [cs.CL] May 22, 2020, pp. 1-7.
Kale, Mihir , et al., Machine Translation Pre-training for Data-to-Text Generation—A Case Study in Czech, arXiv:2004.02077v1 [cs.CL] Apr. 5, 2020, pp. 1-10.
Kale, Mihir , et al., Text-to-Text Pre-Training for Data-to-Text Tasks, arXiv:2005.10433v1 [cs.CL] May 21, 2020, pp. 1-7.
Kale, Mihir , et al., "Few-Shot Natural Language Generation by Rewriting Templates,", arXiv:2004.15006v1 [cs.CL] Apr. 30, 2020, pp. 1-12, 2004.
Keskar, Nitish Shirish, et al., CTRL: a Conditional Transformer Language Model for Controllable Generation, arXiv:1909.05858v1 [cs.CL] Sep. 11, 2019, pp. 1-18.
Keskar, Nitish Shirish, et al., CTRL: a Conditional Transformer Language Model for Controllable Generation, arXiv:1909.05858v2 [cs.CL] Sep. 20, 2019, pp. 1-18.
Lavie, Alon , et al., Meteor: An Automatic Metric for MT Evaluation with High Levels of Correlation with Human Judgments, Proceedings of the Second Workshop on Statistical Machine Translation, pp. 228-231,2007.
Lebret, Remi , et al., Neural Text Generation from Structured Data with Application to the Biography Domain, Proceedings of the 2016 Conference on Empirical Methods in Natural Language Processing, pp. 1203-1213, 2016.
Lin, Chin-Yew , Rouge: A Package for Automatic Evaluation of Summaries, Information Sciences Institute, University of Southern California, pp. 1-8, 2004.
Liu, Yinhan , et al., RoBERTa: A Robustly Optimized BERT Pretraining Approach, arXiv:1907.11692v1 [cs.CL] Jul. 26, 2019, pp. 1-13.
Mi, Fei , et al., Meta-Learning for Low-resource Natural Language Generation in Task-oriented Dialogue Systems, Proceedings of the Twenty-Eighth International Joint Conference on Artificial Intelligence (IJCAI-19), pp. 3151-3157, 2019.
Nayak, Neha , et al., To Plan or not to Plan? Discourse planning in slot-value informed sequence to sequence models for language generation, INTERSPEECH 2017, pp. 3339-3343.
Novikova, Jekaterina , et al., The E2E Dataset: New Challenges For End-to-End Generation, Proceedings of the SIGDIAL 2017 Conference, pp. 201-206.
Papineni, Kishore , et al., BLEU: a Method for Automatic Evaluation of Machine Translation, Proceedings of the 40th Annual Meeting of the Association for Computational Linguistics (ACL), Philadelphia, Jul. 2002, pp. 311-318.
Peng, Baolin , et al., Few-shot Natural Language Generation for Task-Oriented Dialog, arXiv:2002.12328v1 [cs.CL] Feb. 27, 2020, pp. 1-12.
Piwek, Paul , A Flexible Pragmatics-driven Language Generator for Animated Agents, 2003, pp. 1-4.
Radford, Alec , et al., Language Models are Unsupervised Multitask Learners, pp. 1-24, 2019.
Raffel, Colin , et al., Exploring the Limits of Transfer Learning with a Unified Text-to-Text Transformer, arXiv:1910.10683v1 [cs.LG] Oct. 23, 2019, pp. 1-51.
Raffel, Colin , et al., Exploring the Limits of Transfer Learning with a Unified Text-to-Text Transformer, arXiv:1910.10683v2 [cs.LG] Oct. 24, 2019, pp. 1-53.
Raffel, Colin , et al., Exploring the Limits of Transfer Learning with a Unified Text-to-Text Transformer, arXiv:1910.10683v3 [cs.LG] Jul. 28, 2020, pp. 1-67.
Rastogi, Abhinav , et al., Towards Scalable Multi-domain Conversational Agents: The Schema-Guided Dialogue Dataset, arXiv:1909.05855v1 [cs.CL] Sep. 12, 2019, pp. 1-11.
Rastogi, Abhinav , et al., Towards Scalable Multi-Domain Conversational Agents: The schema-Guided Dialogue Dataset, arXiv:1909.05855v2 [cs.CL] Jan. 29, 2020, pp. 1-11.
Tran, Van-Khanh , et al., Adversarial Domain Adaptation for Variational Neural Language Generation in Dialogue Systems, Proceedings of the 27th International Conference on Computational Linguistics, pp. 1205-1217, 2018.
Van Deemter, Kees , et al., Real vs. template-based natural language generation: a false opposition?, 2003 Association for Computational Linguistics, pp. 1-8.
Vedantam, Ramakrishna , et al., CIDEr: Consensus-based Image Description Evaluation, CVPR 2015 paper, pp. 4566-4575.
Wen, Tsung-Hsien , et al., A Network-based End-to-End Trainable Task-oriented Dialogue System, Proceedings of the 15th Conference of the European Chapter of the Association for Computational Linguistics: vol. 1, Long Papers, pp. 438-449, 2017.
Wen, Tsung-Hsien , et al., Multi-domain Neural Network Language Generation for Spoken Dialogue Systems, arXiv:1603.01232v1 [cs.CL] Mar. 3, 2016, pp. 1-11.
Wen, Tsung-Hsien , et al., Semantically Conditioned LSTM-based Natural Language Generation for Spoken Dialogue Systems, Proceedings of the 2015 Conference on Empirical Methods in Natural Language Processing, pp. 1711-1721, 2015.
Yang, Zhillin , et al., XLNet: Generalized Autoregressive Pretraining for Language Understanding, 33rd Conference on Neural Information Processing Systems (NeurIPS 2019), pp. 1-11.
Zhu, Chenguang , et al., "Multi-task Learning for Natural Language Generation in Task-Oriented Dialogue", Proceedings of the 2019 Conference on Empirical Methods in Natural Language Processing (56) References Cited

OTHER PUBLICATIONS and the 9th International Joint Conference on Natural Language Processing, pp. 1261-1266, 2019.

* cited by examiner

GUIDED TEXT GENERATION FOR TASK-ORIENTED DIALOGUE

CROSS-REFERENCE TO RELATED APPLICATIONS

This application is a continuation of U.S. application Ser. No. 17/007,270, filed Aug. 31, 2020, the entire disclosure of which is incorporated by reference herein.

BACKGROUND

Virtual assistants (e.g., Google Assistant) have grown in popularity in recent years, and are increasingly being used to assist in tasks such as finding restaurants, buying event tickets, checking weather forecasts, handling customer service requests, etc. This has led to growth in the number of different Application Programming Interfaces (API) available to virtual assistants. In addition, modern virtual assistants are increasingly being augmented with Natural Language Understanding (NLU) and Natural Language Generation (NLG) capabilities so that the assistant can parse and understand a spoken or typed request, and intelligently interact with one or more APIs to obtain the requested information and convey it back to the user in the form of a written or spoken natural language response.

However, this growth in the sophistication of virtual assistants has also led to growth in the complexity of the potential requests and responses a virtual assistant may be expected to handle. For example, where a user's request requires a virtual assistant to collect multiple pieces of information and/or interact with multiple APIs, it can be difficult for a virtual assistant to combine the received information into an accurate, coherent, and fluent response. This is especially true when the virtual assistant is handling information it was not originally trained to handle, as may be the case with newly introduced or recently updated APIs. The present technology relates to improved systems and methods for generating coherent NLG responses in such circumstances.

BRIEF SUMMARY

The present technology proposes two improved approaches to text generation. In one aspect, the present technology proposes an improved data-driven approach for text generation. In that regard, in data-driven approaches, a learned NLG model is trained to generate a natural language response based solely on the data received from each API. More specifically, the automated assistant will receive organized data from an API and will generate one or more dialogue acts based on that data. The automated assistant will then feed those dialogue acts to a pretrained NLG model (e.g., a deep neural network pretrained as a "T5" Text-to-Text Transfer Transformer model) that has been further fine-tuned to transform dialogue acts into corresponding natural language utterances. For example, a dialogue act such as "inform" may include both a slot (e.g., "restaurant") and a value (e.g., "Al's Deli"), such that the full dialogue act of "inform(restaurant=Al's Deli)" may be transformed by the NLG model into an utterance such as "Al's Deli is a good restaurant nearby." In other cases, a dialogue act such as "request" may include only a slot (e.g., "cuisine"), such that the dialogue act "request(cuisine)" may result in an utterance such as "What type of food are you interested in?" However, in order for a traditional data-driven approach to accurately transform a dialogue act into an intelligible utterance, the NLG model needs to be trained first on a large amount of annotated text in order to correctly infer what the slots and values mean. Even still, in traditional data-driven approaches, the NLG model can fail to correctly interpret dialogue acts based on new or updated APIs, particularly if the subject matter differs from the domains on which the NLG model was trained.

To address this, the present technology proposes an improved schema-guided approach in which the name of each slot in each dialogue act is replaced with a natural language description ("schema") of the type of information represented by the slot. Thus, for example, rather than the NLG system generating an utterance based solely on the dialogue act "inform(restaurant=Al's Deli)," it will do so based on the more informative modified dialogue act of "inform(name of restaurant=Al's Deli)." By providing this additional context, the schema-based approach of the present technology is able to more reliably interpret dialogue acts outside of the domains on which its NLG model was trained, and thus can better handle the outputs of new or updated APIs.

Nevertheless, data-driven approaches still require that the NLG model be fine-tuned using a sufficiently large and representative training set of dialogue acts as input so that it can correctly infer how to translate a given dialogue act into a comprehensible natural language utterance. Adequately training the NLG model, and retraining it where necessary, can be costly in terms of time and computing resources. In addition, it can be very costly in terms of time and/or money to obtain or create sets of labeled training data for use in training and retraining the NLG model. In response, the present technology also proposes an improved template-guided approach to text generation. In that regard, before the introduction of machine-learning, some early NLG systems formulated utterances solely based on human-generated templates. For example, if an API was configured to return the highest-rated restaurant within a given radius, a template-based NLG system might be configured to insert the output of that API into a pre-composed sentence such as "[Name] is the most popular restaurant in the area." A major benefit of such template-based systems is that the human-generated templates can be crafted to ensure that the responses are fluent and predictable. However, traditional template-based approaches do not scale well, and thus quickly become impractical in a context where the system will be expected to combine disparate pieces of information received from more than one API (or from separate calls to a single API), as additional templates must then be created to cover every type of combined response, as well all grammatical variants thereof.

To address this, the present technology proposes an improved template-guided system in which only a small set of simple templates need to be defined for each API, because the final natural language response will be generated by an NLG model trained as a sequence-to-sequence transformer (e.g., a deep neural network pretrained as a "T5" Text-to-Text Transfer Transformer model). This architecture enables the system to take advantage of the semantic meaning built into each templated response, while removing the need to anticipate how to fluently combine multiple responses. In that regard, in the improved template-guided approach of the present technology, for any multi-part response, the virtual assistant will simply concatenate the templated responses received from each API to form a sequence of text, and the NLG model will then smooth out that sequence to generate the final response to be provided to the user. Importantly, in this improved template-guided approach, the templates do not need to address all possible linguistic contingencies (e.g., plurals, subject-verb agreement, etc.), and the combined sequence of templated responses does not need to form a grammatically correct utterance, as the sequence-to-sequence transformer model will rewrite the sequence into a fluent and intelligible response. Moreover, a sequence-to-sequence transformer can be pretrained and fine-tuned to perform the sequence-to-sequence transformation tasks described herein in much less time and with much less annotated data than it takes to train an NLG model to create responses directly from dialogue acts. In addition, the sequence-to-sequence transformer is less effected by new APIs and changes to existing APIs and thus requires less frequent (or no) re-training when compared to an NLG model trained to generate responses directly from dialogue acts. As a result, the template-guided approach of the present technology results in substantially lower training costs, while providing even better cross-domain performance than a schema-guided or traditional data-driven approach.

In one aspect, the disclosure describes a virtual assistant system, comprising: a memory; and one or more processors coupled to the memory. The one or more processors are configured to: (i) receive an input from a user; (ii) identify a plurality of applications to be called based on the input; (iii) generate a call to each application of the plurality of applications, each call including first data based on the input; (iv) receive, for each given application of the plurality of applications, second data from the call to the given application; (v) generate, for each given application of the plurality of applications, at least one templated response including some or all of the second data; (vi) concatenate each templated response generated for each given application of the plurality of applications to create a concatenated sequence; and (vii) generate a natural language response based on the concatenated sequence. In some aspects, the one or more processors are further configured to generate the natural language response based on the concatenated sequence using a learned sequence-to-sequence transformer to transform the concatenated sequence into the natural language response. In some aspects, for each given application of the plurality of applications, the second data includes the at least one templated response. In some aspects, for each given application of the plurality of applications, the second data includes at least one template and information; and the one or more processors are further configured to, for each given application of the plurality of applications, generate the at least one templated response by combining at least the information and the at least one template. In some aspects, for at least one application of the plurality of applications, the one or more processors are further configured to generate the at least one templated response by combining at least the information, some or all of the first data, and the at least one template. In some aspects, the one or more processors are further configured to: (viii) select, for each given application of the plurality of applications, at least one template based on the second data, and (ix) generate, for each given application of the plurality of applications, the at least one templated response by combining at least the second data and the at least one template. In some aspects, for at least one application of the plurality of applications, the one or more processors are further configured to generate the at least one templated response by combining at least the second data, some or all of the first data, and the at least one template. In some aspects, the one or more processors are further configured to receive the input from the user as a text entry. In some aspects, the one or more processors are further configured to receive the input from the user as a verbal command. In some aspects, the one or more processors are further configured to receive the input from the user as a result of the user pressing a button, or as a result of the user making a selection from a user interface.

In another aspect, the disclosure describes a computer-implemented method for generating a natural language response, comprising: (i) receiving, by one or more processors of a processing system, an input from a user; (ii) identifying, by the one or more processors, a plurality of applications to be called based on the input; (iii) generating, by the one or more processors, a call to each application of the plurality of applications, each call including first data based on the input; (iv) receiving, by the one or more processors, for each given application of the plurality of applications, second data from the call to the given application; (v) generating, by the one or more processors, for each given application of the plurality of applications, at least one templated response including some or all of the second data; (vi) concatenating, by the one or more processors, each templated response generated for each given application of the plurality of applications to create a concatenated sequence; and (vii) generating, by the one or more processors, a natural language response based on the concatenated sequence. In some aspects, generating, by the one or more processors, the natural language response based on the concatenated sequence comprises using a learned sequence-to-sequence transformer to transform the concatenated sequence into the natural language response. In some aspects, for each given application of the plurality of applications, the second data includes the at least one templated response. In some aspects, for each given application of the plurality of applications, the second data includes at least one template and information; and generating, for each given application of the plurality of applications, the at least one templated response further comprises combining at least the information and the at least one template. In some aspects, for at least one application of the plurality of applications, generating the at least one templated response further comprises combining at least the information, some or all of the first data, and the at least one template. In some aspects, the method further comprises: (viii) selecting, by the one or more processors, for each given application of the plurality of applications, at least one template based on the second data; and (ix) generating, for each given application of the plurality of applications, the at least one templated response further comprises combining at least the second data and the at least one template. In some aspects, for at least one given application of the plurality of applications, generating the at least one templated response further comprises combining at least the second data, some or all of the first data, and the at least one template. In some aspects, the input from the user is a text entry. In some aspects, the input from the user is a verbal command. In some aspects, the input from the user results from the user pressing a button, or from the user making a selection from a user interface.

DETAILED DESCRIPTION

The present technology will now be described with respect to the following exemplary systems and methods.

Example Systems

Figure 1:
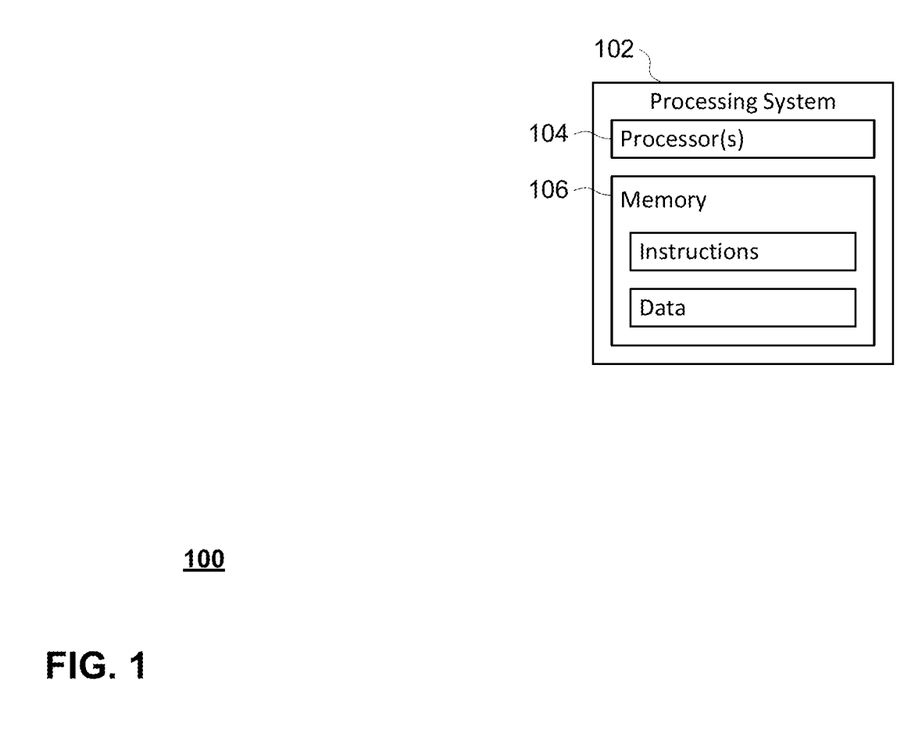
FIG. 1 is a functional diagram of an example system in accordance with aspects of the disclosure.

A high-level system diagram 100 of an exemplary processing system for performing the methods described herein is shown in FIG. 1. The processing system 102 may include one or more processors 104 and memory 106 storing instructions and data. The instructions and data may include the virtual assistant system and the NLG model described herein. Processing system 102 may be resident on a single computing device. For example, processing system 102 may be the device with which the user is interacting (e.g., a mobile device or a PC), and the virtual assistant and the NLG model may thus be local to that device.

However, in some aspects of the technology, processing system 102 may be distributed, such that the virtual assistant system and the NLG model (or portions thereof) reside on different physical computing devices. For example, processing system 102 may be distributed between a user device and one or more remote servers (e.g., a cloud-computing system). In that regard, the virtual assistant system may be distributed between a user device and a remote server such that the user-side portion is configured only to accept the user's request and convey the final response, and the server-side portion is configured to receive the request (from the user-side portion), parse it, make all necessary API calls, generate the natural language response, and pass the final response back to the user-side portion. Likewise, in some aspects of the technology, a user-side portion of the virtual assistant may be configured to pass the user's request to a server-side portion solely for NLG processing tasks, such that the client-side portion handles all API calls, creates all dialogue acts or templated responses, and then passes those dialogue acts or templated responses back to the NLG model for generating the final natural language response.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Schema-Guided Text Generation

Figure 2:
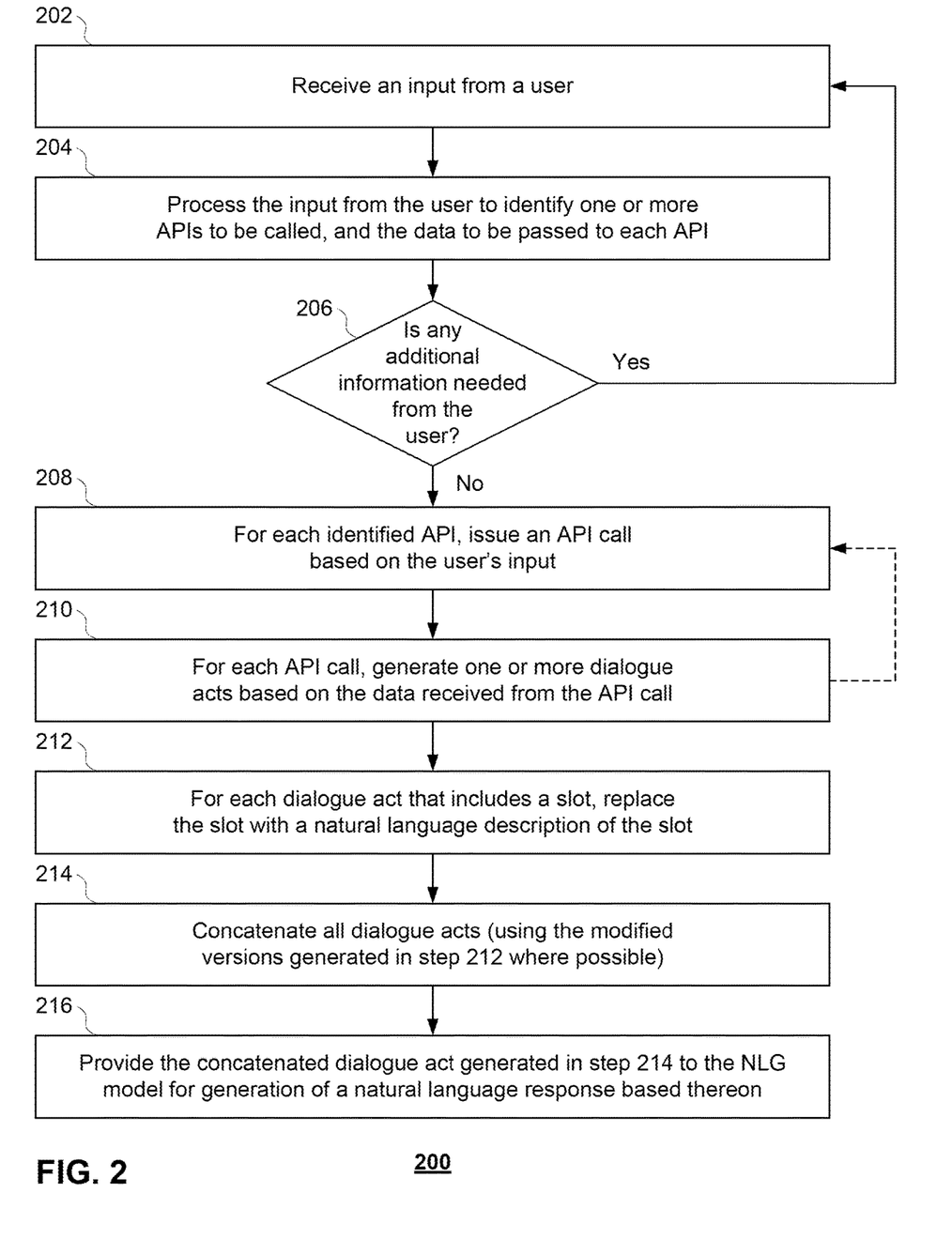
FIG. 2 is a flow diagram showing an exemplary method for generating a natural language response using a schema-guided approach, according to aspects of the disclosure.

FIG. 2 depicts an exemplary method 200 showing how a virtual assistant may receive and respond to an input from a user using a schema-guided approach in accordance with aspects of the disclosure. In step 202, the virtual assistant receives an input from a user. The input may be a verbal input from the user, a typed input from the user, an input generated by the user pressing a button (e.g., a physical button or a soft button) or clicking or selecting something on a user interface, or any other form of input that the virtual assistant is configured to accept. Likewise, the content of the input may be a command (e.g., find nearby restaurants), a question (e.g., what is the highest rated restaurant within 2 miles), or any other type of input that the virtual assistant is configured to handle. For the purposes of illustrating method 200, we will assume going forward that the user verbally asks the virtual assistant "What is the best place for a sandwich nearby, and how far is it from public transportation?"

In step 204, the virtual assistant processes the input from the user to identify one or more APIs to be called, and the data to be passed to each API. Thus, continuing with the same example, the virtual assistant will be configured to process the question "What is the best place for a sandwich nearby, and how far is it from public transportation?" to determine what API or APIs would need to be called, and what data would need to be provided to each such API to obtain the information the user is requesting. Where this processing entails parsing natural language (as it does in the present example), the virtual assistant will utilize a natural language understanding (NLU) module to interpret the meaning of the question. In addition, where the input is conveyed verbally, the virtual assistant (or its NLU module) may be configured to first process the audio data using voice recognition software in order to create a textual version of the input. In that regard, the user device may be configured to perform this voice recognition step, or the user device may be configured to pass the audio file to a remote processing system configured to perform the voice recognition. Of course, in cases where the input is not verbal (e.g., typed, or generated by a user clicking or selecting something), voice recognition is not necessary. In the present example, the virtual assistant may identify an API configured to locate nearby restaurants by type, which requires three pieces of information: current location; search radius; and type of restaurant. In addition, the virtual assistant may also identify an API configured to find the closest public transportation hub to a given location which only requires a reference location to be entered.

In step 206, the virtual assistant will check whether any additional information is needed from the user. For example, if the virtual assistant was unable to understand the input originally, it may ask the user to repeat or restate the original question or command. Likewise, if the virtual assistant was able to understand the original input, but was not provided enough information to identify the API(s) to be invoked, it may ask for additional information. In addition, if the virtual assistant was able to identify one or more APIs to be invoked, but requires additional information in order to make one or more of the API calls, it may ask for that additional information. Thus, in the present example, the virtual assistant's NLG model may be able to match "place for a sandwich" to a relevant "deli/sandwich" subcategory of restaurants defined in that API corresponding to restaurants that mainly serve sandwiches. Likewise, the virtual assistant may be configured to automatically access the user's current location so that a follow-up question in that regard is not required.

However, as the user's original request did not specify a particular search radius, the virtual assistant may be configured to ask the user how far they are willing to travel. In such a case, as indicated by the "yes" arrow extending from step 206, the method 200 would loop back through steps 202-206 in order to receive and process that additional input and determine if any further input is still needed. These additional user prompts may be generating by the NLG model based on a dialogue act such as "request" or "req_more" as described further below. In all cases, as indicated by the "no" arrow extending from step 206, once the virtual assistant has collected all the information it needs to make each indicated API call, the method 200 will proceed to step 208.

In step 208, for each API identified in step 204, the virtual assistant issues an API call based on the user's input(s).

Continuing with the present example, the virtual assistant will issue a call to first identified API that is configured to locate nearby restaurants of a certain type, and will pass the user's current location, indicated search radius (received from a follow-up question to the user), and the identified subcategory of "deli/sandwich" to that first API. In addition, the virtual assistant may be configured to issue a call to the second identified API that is configured to locate all nearby public transportation hubs, and that call would include user's current location.

In step 210, for each API called in step 208, the virtual assistant will receive a response and generate one or more dialogue acts based on that response. Thus, in the present example, the virtual assistant may receive a first list of "deli/sandwich" restaurants within the indicated search radius from the first API, and may receive a second list of nearby public transportation hubs from the second API. As will be appreciated, the virtual assistant may be configured to identify the highest rated "deli/sandwich" restaurant from the first list and use its address to identify the nearest public transportation hub to that address from the second list. However, as indicated by the dashed arrow connecting steps 208 and 210, in some aspects of the technology, steps 208 and 210 may also be repeated as necessary to make all indicated API calls. For example, the virtual assistant may determine to only call the first API in the initial pass through steps 208 and 210, and then to return to step 208 so that the second API can be called using the address of the highest rated "deli/sandwich" restaurant in order obtain a more targeted list of public transportation hubs proximate to that restaurant.

In any event, as indicated in step 210, once responses have been received for all APIs identified in step 204, the virtual assistant will generate a dialogue act for each response that was received. In that regard, a dialogue act may take any suitable form, but will generally consist of a basic action (e.g., inform, request, "req_more" (request more), and then may include one or more "slots" indicating a type or category of information, and/or one or more "values" indicating a specific piece of information in a given "slot." Thus, based on the responses received from the first and second APIs in the present example, the virtual assistant may generate a first dialogue act of inform(restaurant="Al's Deli") based on the first API having indicated that "Al's Deli" is the highest rated "deli/sandwich" restaurant in the indicated search radius. Likewise, the virtual assistant may generate a second dialogue act of inform(type="bus stop", address="North Avenue and Center Street", distance="203 ft") based on the second API having indicated that the closest public transportation hub to "Al's Deli" is a bus stop located 203 feet away from Al's Deli at the intersection of North Avenue and Center Street.

In some cases, the virtual assistant may determine from the API responses that further information is needed. In such cases, the virtual assistant may issue a dialogue act based on one or more of the API calls that asks for more information for a given slot. For example, if the second API returns both a bus stop and a train station that are determined to be equally close to "Al's deli," the virtual assistant may be configured to generate a dialogue act of request(type) in order to prompt the user to indicate which form of transportation they prefer. Likewise, if the first API cannot find any "deli/sandwich" restaurant in the search radius, the virtual assistant may be configured to generate dialogue acts of inform(restaurant=null) and req_more( ) in order to inform the user that it was unable to find the requested type of restaurant, and to ask if the user would like to initiate another search. If the user does choose to initiate another search, this may result in the method being restarted at step 202.

The virtual assistant may be further configured to include in each dialogue act more information than was received in each API response. For example, in some aspects of the technology, the virtual assistant may be configured to include in each dialogue act the relevant information input by the user, so that the context of the user's question will be reflected in the eventual natural language response. For example, the virtual assistant may be configured to include the type of restaurant, and search radius in the first dialogue act so that it becomes inform(restaurant="Al's Deli", type="deli/sandwich", radius="5 miles"). Likewise, the virtual assistant may be configured to include the reference address in the second dialogue act so that it becomes inform(type="bus stop", address="North Avenue and Center Street", distance="203 ft", ref address="345 North Avenue").

In step 212, for each dialogue act that includes a slot, the virtual assistant will replace the slot with a natural language description of the type of information represented by the slot. Thus, assuming that the virtual assistant has generated a first dialogue act of inform(restaurant="Al's Deli") and a second dialogue act of inform(type="bus stop", address="North Avenue and Center Street", distance="203 ft"), the virtual assistant will replace the slot names of "restaurant," "type," "address," and "distance" with natural language descriptions thereof. For example, the virtual assistant may convert the first dialogue act into a modified dialogue act of inform("name of restaurant"="Al's Deli"), and may convert the second dialogue act into inform("type of public transportation hub"="bus stop", "address of transportation hub"="North Avenue and Center Street", "distance to final location"=203 ft). Although the intention is to replace each slot name, in some cases the slot name may be deemed descriptive enough that a further natural language description is not necessary or helpful. In addition, although step 212 describes modifying the dialogue acts created in step 210 with natural language descriptions of each slot, in some aspects of the technology, step 210 may be omitted for any dialogue act that would include a slot, and the virtual assistant may instead be configured to generate each dialogue act in the first instance using the natural language descriptions of each slot.

The natural language descriptions used in step 212 may be obtained directly from the API developer, or may come from a database or other data structure maintained by the developer of the virtual assistant. For example, in some aspects of the technology, the response from the API may include the natural language description of each slot. In some aspects of the technology, the API may be configured to provide the natural language descriptions in response to separate follow-up calls from the virtual assistant. In some aspects of the technology, the API developer may provide to the virtual assistant a full database of the natural language descriptions for each slot used by the API, so that the virtual assistant can query the database locally. In some aspects of the technology, the virtual assistant developer may create its own database of natural language descriptions for the slots of a given API.

In step 214, the virtual assistant concatenates all dialogue acts, using the modified dialogue acts generated in step 212 wherever possible. In that regard, as step 212 will not result in modification of any dialogue act that lacks a slot name, any such slot-less dialogue acts (e.g., the "req_more( )" act described previously) will thus be included unchanged in the concatenated dialogue act created in step 214. Thus, assuming that the virtual assistant generated the first and second dialogue acts mentioned in the prior examples, it would then combine them to create the following concatenated dialogue act: (inform("name of restaurant"="Al's Deli"), inform ("type of public transportation hub"="bus stop", "address of transportation hub"="North Avenue and Center Street", "distance to final location"=203 ft)).

Finally, in step 216, the virtual assistant provides the concatenated dialogue act generated in step 214 to the NLG model for generation of a natural language response based on the concatenated dialogue act. The resulting natural language response may then be provided back to the user either in a textual or audio format. Where the virtual assistant is configured to provide the natural language response in audio format, it may do so by processing the natural language response of step 216 using text-to-speech software. Here as well, any such text-to-speech processing may be performed by the user device, or by one or more remote computing devices to which the user device has access.

The NLG model of step 216 may be any model that has been trained to transform dialogue acts into corresponding natural language utterances. For example, the NLG model may be a deep neural network pretrained as a "T5" Text-to-Text Transfer Transformer model, and fine-tuned on a representative set of dialogue acts so that it can reliably translate a given dialogue act into an accurate, complete, and fluent natural language utterance. In addition, any suitable architecture may be used for the NLG model. For example, in some aspects of the technology, the NLG model may be a T5-small model having 6 layers each in the encoder and decoder, and roughly 60 million parameters in total. Further, any suitable training regimen may be used. For example, the NLG model may be fine-tuned using a constant learning rate of 0.001 and a batch size of 256 for 5000 steps, and one or more automatic metrics (e.g., BLEU, SER (Slot Error Rate)) may be employed in fine-tuning to assess how well each generated natural language response matches the reference response of each training example.

Template-Guided Text Generation

Figure 3:
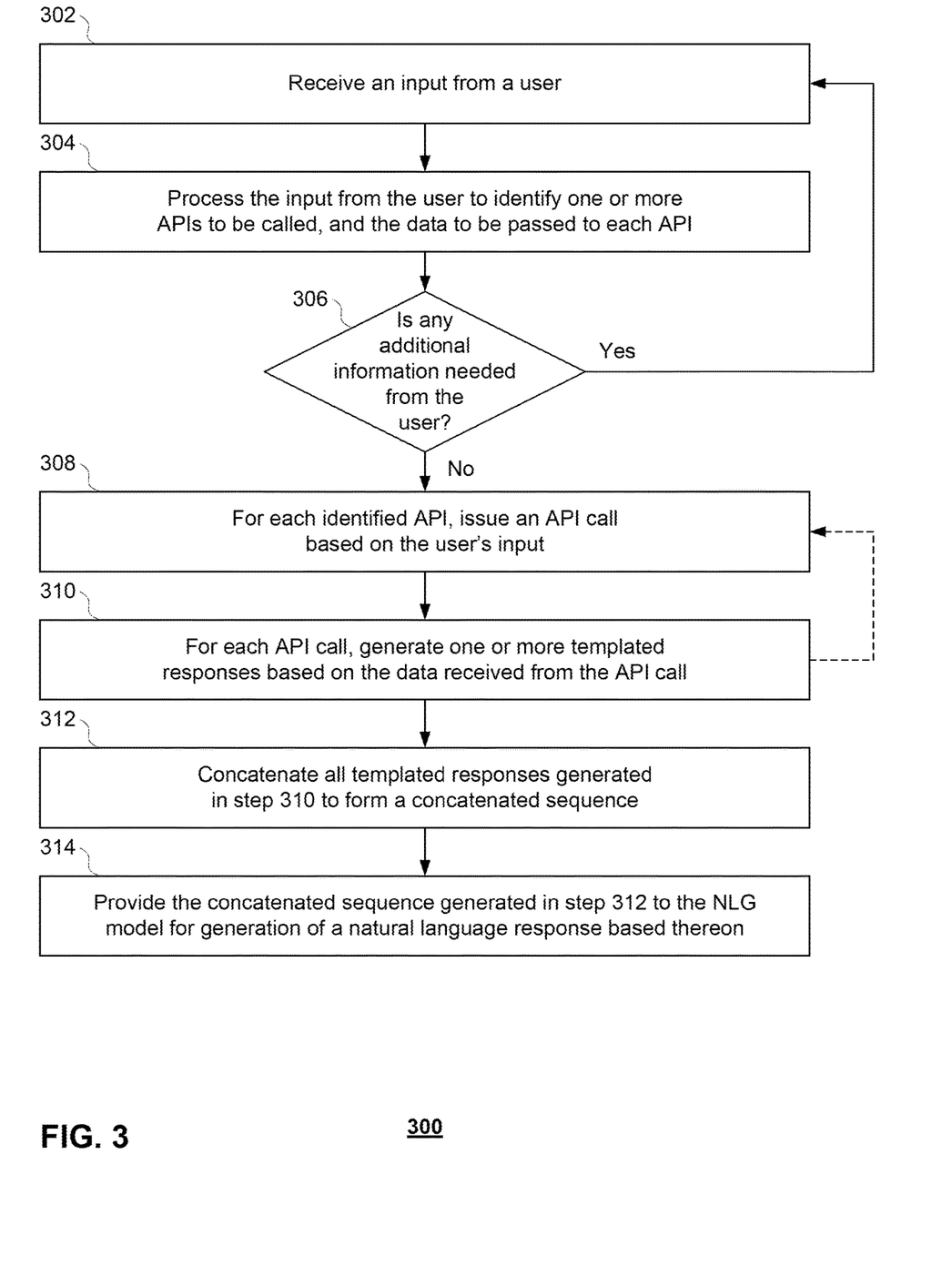
FIG. 3 is a flow diagram showing an exemplary method for generating a natural language response using a template-guided approach, according to aspects of the disclosure.

FIG. 3 depicts an exemplary method 300 showing how a virtual assistant may receive and respond to an input from a user using a template-guided approach in accordance with aspects of the disclosure. In step 302, the virtual assistant receives an input from a user. Here as well, any suitable type and content of input may be provided, as described above with respect to step 202 of FIG. 2. Likewise, we will again assume that the user verbally asks the virtual assistant "What is the best place for a sandwich nearby, and how far is it from public transportation?"

In step 304, the virtual assistant processes the input from the user to identify one or more APIs to be called, and the data to be passed to each API, in the same way as has been described above with respect to step 204 of FIG. 2. Thus, continuing with the same example, the virtual assistant will be configured to process the question "What is the best place for a sandwich nearby, and how far is it from public transportation?" to determine what API or APIs would need to be called, and what data would need to be provided to each such API to obtain the information the user is requesting. Where this processing entails parsing natural language (as it does in the present example), the virtual assistant will utilize its NLU module to interpret the meaning of the question. In addition, where the input is conveyed verbally, the virtual assistant (or its NLU module) may be configured to first process the audio data using voice recognition software in order to create a textual version of the input as has been described above. In the present example, the virtual assistant may identify an API configured to locate nearby restaurants by type, which requires three pieces of information: current location, search radius, type of restaurant. In addition, the virtual assistant may also identify an API configured to find the closest public transportation hub to a given location which only requires a reference location to be entered.

In step 306, the virtual assistant will check whether any additional information is needed from the user, in the same way as has been described above with respect to step 206 of FIG. 2. Again, as indicated by the "yes" arrow extending from step 306, if the virtual assistant does require more information, it will prompt the user for that information, and the method 300 will loop back through steps 302-306 in order to receive and process that additional input and determine if any further input is still needed. Likewise, as indicated by the "no" arrow extending from step 306, once the virtual assistant has collected all the information it needs to make the each indicated API call, the method 300 will proceed to step 308.

In step 308, for each API identified in step 304, the virtual assistant issues an API based on the user's input(s). Continuing with the present example, the virtual assistant will issue a call to the first identified API that is configured to locate nearby restaurants of a certain type, and will pass the user's current location, indicated search radius (e.g., as received from a follow-up question to the user), and an identified type of restaurant (e.g., "deli/sandwich") to that first API. In addition, the virtual assistant may be configured to issue a call to the second identified API that is configured to locate all nearby public transportation hubs, and that call will include the user's current location.

In step 310, for each API called in step 308, the virtual assistant will receive a response and generate one or more templated responses based on that API response. The templates may be generated by the API developer or the developer of the virtual assistant system. Thus, in some aspects of the technology, the API response may be one or more complete templated responses. In some aspects of the technology, the API response may include the data and the one or more templates, and the virtual assistant may be responsible for inserting the data into the template(s) in order to generate the one or more complete templated responses. In some aspects of the technology, the API response may include only selected data, and the virtual assistant may be responsible for generating one or more templated responses based on that data and its own templates. This may include the virtual assistant selecting one or more appropriate templates from a database or other data structure maintained by the developer of the virtual assistant.

Thus, in the present example, the first API may provide a first list of "deli/sandwich" restaurants within the indicated search radius from the first API, and the second API may provide a second list of nearby public transportation hubs from the second API. Here again, the virtual assistant may be configured to identify the highest rated "deli/sandwich" restaurant from the first list and use its address to identify the nearest public transportation hub to that address from the second list. Likewise, as indicated by the dashed arrow connecting steps 308 and 310, in some aspects of the technology, steps 308 and 310 may also be repeated as necessary to make all indicated API calls. Thus, for example, the virtual assistant may determine to only call the first API in the initial pass through steps 308 and 310, and then to return to step 308 so that the second API can be called using the address of the highest rated "deli/sandwich" restaurant in order obtain a more targeted list of public transportation hubs proximate to that restaurant.

In any event, once the highest rated "deli/sandwich" restaurant and the corresponding nearest public transportation hub have been identified, the virtual assistant will insert that information into the basic templates for each API. For example, based on the first API having indicated that "Al's Deli" is the highest rated "deli/sandwich" restaurant in the indicated search radius of 5 miles, and based on the first API having two relevant templates of "[restaurant] is top rated [type] restaurant" and "It is within [radius] of your present location," the virtual assistant would generate a first templated response of "Al's Deli is top rated deli/sandwich restaurant," and a second templated response of "It is within 5 miles of your present location." As can be seen from this example, the individual templates need not be perfect, as the first templated response is not grammatically correct, and uses the somewhat awkward term "deli/sandwich restaurant," and the second templated response is uninformative by itself due to using "it" in place of the name of the restaurant.

Likewise, based on the second API having indicated that the closest public transportation hub to "Al's Deli" is a bus stop located 203 feet away at the intersection of North Avenue and Center Street, and based on the second API having three relevant templates of "The closest public transportation is [type]," "The address is [address]," and "It is [distance] away," the virtual assistant would generate a third templated response of "The closest public transportation is bus stop," a fourth templated response of "The address is North Avenue and Center Street," and a fifth templated response of "It is 203 feet away." Here as well, the third templated response is ungrammatical, and the fourth and fifth templated responses are uninformative by themselves due to not repeating the subject ("bus stop").

As shown in these examples, the templates may be configured to incorporate both data that has been received from each API call (e.g., best restaurant, type of closest public transportation, address of bus stop, distance from final location), as well as other data such as the information that was passed to the API in each API call (e.g., search radius, restaurant type). However, in some aspects of the technology, the APIs may instead be configured to return all information necessary to create each templated response.

Here as well, in some cases the virtual assistant may determine from the API responses that further information is needed. In such cases, the virtual assistant may prompt the user for any such further information, as already explained above with respect to step 210 of FIG. 2.

In step 312, the virtual assistant concatenates all templated responses. Thus, assuming that the virtual assistant generated the five simple templated responses mentioned in the prior example, the virtual assistant would then combine them to create the following concatenated sequence: "Al's Deli is top rated deli/sandwich restaurant. It is within 5 miles of your present location. The closest public transportation is bus stop. The address is North Avenue and Center Street. It is 203 feet away." As can be seen from this example, a collection of simple templated responses can become even less fluent once combined, and can also become more unclear where individual templates fail to expressly state a subject, e.g., it is not clear in this example whether "The address" pertains to Al's deli or the bus stop.

Finally, in step 314, the virtual assistant provides the concatenated sequence generated in step 312 to the NLG model, which generates a natural language response based on that concatenated sequence. For example, using the illustrative concatenated sequence of step 312, the NLG model may return a final natural language response of: "Al's Deli is the best place for a sandwich within 5 miles of your location, and the closest bus stop is 203 feet away at North Avenue and Center Street." As can be seen from this example, through the smoothing introduced by the learned sequence-to-sequence transformer, an otherwise unnatural and unclear concatenated sequence can be transformed into an utterance that is both fluent and comprehensible. Here again, the resulting natural language response may be provided back to the user either in a textual or audio format, as described above with respect to step 216 of FIG. 2.

The NLG model of step 314 may be any model trained in sequence-to-sequence text transformation. For example, the NLG model may be a deep neural network pretrained as a "T5" Text-to-Text Transfer Transformer model so that it can reliably translate a given sequence of text into a different sequence of text that accurately and fluently conveys the same meaning. Here as well, any suitable architecture may be used for the NLG model. Again, for example, in some aspects of the technology, the NLG model may be a T5-small model having 6 layers each in the encoder and decoder, and roughly 60 million parameters in total. Further, any suitable training regimen may be used to train the NLG model to perform sequence-to-sequence text transformation. For example, the NLG model may be pre-trained according to the training regimen described in Raffel et al., *Exploring the Limits of Transfer Learning with a Unified Text-to-Text Transformer,* arXiv preprint arXiv:1910.10683, 2019.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A virtual assistant system, comprising:
memory; and
one or more processors coupled to the memory and configured to:
generate, for each given application of a plurality of applications, a templated response including data obtained in response to an application call;
concatenate each templated response generated for each given application of the plurality of applications to create a concatenated sequence; and
generate a natural language response based on the concatenated sequence.

2. The system of claim 1, wherein the one or more processors are configured to generate the natural language response based on the concatenated sequence using a learned sequence-to-sequence transformer to transform the concatenated sequence into the natural language response.

3. The system of claim 1, wherein, for each given application of the plurality of applications, the one or more processors are configured to receive the data from the application call to each given application, the data including the templated response.

4. The system of claim 1, wherein:
for each given application of the plurality of applications, the one or more processors are configured to receive the data from the application call to each given application, the data including at least one template and information, and
the one or more processors are further configured, for each given application of the plurality of applications, to generate the templated response by combining at least the information and the at least one template.

5. The system of claim 4, wherein, for at least one application of the plurality of applications, the one or more processors are further configured to generate the templated response by combining at least the information, the at least one template, and data based on input received from a user.

6. The system of claim 1, wherein the one or more processors are further configured to:
select, for each given application of the plurality of applications, at least one template based on the data associated with the application call to that given application, and
wherein generation, for each given application of the plurality of applications, of the templated response includes combining at least the data and the at least one template.

7. The system of claim 6, wherein, for at least one application of the plurality of applications, the one or more processors are further configured to generate the templated response by combining at least the data, the at least one template, and data based on input received from a user.

8. The system of claim 1, wherein the one or more processors are further configured to receive input from a user as a text entry, and to provide the natural language response in response to the received input.

9. The system of claim 1, wherein the one or more processors are further configured to receive input from a user as a verbal command, and to provide the natural language response in response to the received input.

10. The system of claim 1, wherein the one or more processors are further configured to receive input from a user as a result user interaction with a user interface, and to provide the natural language response in response to the received input.

11. A computer-implemented method, comprising:
generating, by one or more processors of a processing system, for each given application of a plurality of applications, a templated response including data in response to an application call;
concatenating, by the one or more processors, each templated response generated for each given application of the plurality of applications to create a concatenated sequence; and
generating, by the one or more processors, a natural language response based on the concatenated sequence.

12. The method of claim 11, wherein generating, by the one or more processors, the natural language response based on the concatenated sequence comprises using a learned sequence-to-sequence transformer to transform the concatenated sequence into the natural language response.

13. The method of claim 11, wherein, for each given application of the plurality of applications, receiving the data from the application call to each given application, the data including the templated response.

14. The method of claim 11, wherein:
for each given application of the plurality of applications, the data includes at least one template and information, and
generating, for each given application of the plurality of applications, the templated response further comprises combining at least the information and the at least one template.

15. The method of claim 14, wherein, for at least one application of the plurality of applications, generating the templated response further comprises combining at least the information, the at least one template, and data based on input received from a user.

16. The method of claim 11, further comprising:
selecting, by the one or more processors, for each given application of the plurality of applications, at least one template based on the data associated with the application call to that given application, and
wherein generating, for each given application of the plurality of applications, the templated response includes combining at least the data and the at least one template.

17. The method of claim 16, wherein, for at least one given application of the plurality of applications, generating one templated response further comprises combining at least the data, the at least one template, and data based on input received from a user.

18. The method of claim 11, further comprising:
receiving input from a user via text entry; and
providing the natural language response in response to the received input.

19. The method of claim 11, further comprising:
receiving input from a user via a verbal command; and
providing the natural language response in response to the received input.

20. The method of claim 11, further comprising:
receiving input from a user via user interaction with a user interface; and
providing the natural language response in response to the received input.

\* \* \* \* \*